(12) United States Patent
Graziosi et al.

(10) Patent No.: US 9,249,867 B2
(45) Date of Patent: Feb. 2, 2016

(54) RETENTION MECHANISMS FOR BICYCLE DRIVE TRAINS

(71) Applicant: Gamut USA, San Jose, CA (US)

(72) Inventors: Mateo Graziosi, San Francisco, CA (US); Eduardo Graziosi, San Jose, CA (US); Juan Graziosi, San Jose, CA (US)

(73) Assignee: Gamut USA, San Jose, CA (US)

( * ) Notice: Subject to any disclaimer, the term of this patent is extended or adjusted under 35 U.S.C. 154(b) by 264 days.

(21) Appl. No.: 13/771,982

(22) Filed: Feb. 20, 2013

(65) Prior Publication Data

US 2013/0217527 A1 Aug. 22, 2013

Related U.S. Application Data

(60) Provisional application No. 61/601,013, filed on Feb. 20, 2012.

(51) Int. Cl.
*F16H 7/18* (2006.01)
*B62M 9/16* (2006.01)
*B62M 9/00* (2006.01)

(52) U.S. Cl.
CPC . *F16H 7/18* (2013.01); *B62M 9/16* (2013.01); *B62M 2009/007* (2013.01)

(58) Field of Classification Search
CPC ...... F16H 7/18; B62M 9/16; B62M 2009/007
USPC ........................................................ 474/140
See application file for complete search history.

(56) References Cited

U.S. PATENT DOCUMENTS

| | | | | |
|---|---|---|---|---|
| 3,838,606 A * | 10/1974 | Scalise | ...................... | B62M 9/16 474/111 |
| 4,036,069 A * | 7/1977 | Clark | ........................ | B62M 9/16 474/135 |
| 4,069,719 A * | 1/1978 | Cancilla | .................... | B62M 9/16 474/134 |
| 4,471,851 A * | 9/1984 | Kamiya | .................... | B62J 13/00 180/219 |
| 4,662,862 A * | 5/1987 | Matson | ...................... | F16H 7/08 474/101 |
| 4,798,562 A * | 1/1989 | Matson | ...................... | F16H 7/08 474/101 |
| 5,679,084 A * | 10/1997 | Daniels, III | ............. | B62M 9/16 474/140 |
| 5,725,450 A * | 3/1998 | Huskey | .................... | B62M 9/06 474/116 |
| 6,165,092 A * | 12/2000 | Bramham | ................ | B62M 9/16 474/134 |
| 6,533,690 B2 * | 3/2003 | Barnett | .................... | B62J 13/00 474/116 |
| 7,708,295 B2 * | 5/2010 | Wesling | ................. | B62K 19/34 280/260 |
| 8,434,776 B2 * | 5/2013 | Wuthrich | ................. | B62K 3/10 280/261 |
| 8,561,750 B2 * | 10/2013 | Kakimoto | ................ | B62M 9/16 180/357 |
| 8,968,129 B2 * | 3/2015 | Emura | ..................... | B62M 9/16 474/111 |
| 2005/0159260 A1* | 7/2005 | Gogo | ........................ | B62J 13/00 474/111 |
| 2012/0248730 A1* | 10/2012 | Sloan | ........................ | B62M 9/16 280/210 |
| 2013/0053196 A1* | 2/2013 | Emura | ..................... | B62M 9/136 474/140 |
| 2013/0190118 A1* | 7/2013 | Luede | ..................... | B62M 9/136 474/140 |
| 2014/0051535 A1* | 2/2014 | Cranston | .................. | F16H 7/20 474/140 |

* cited by examiner

*Primary Examiner* — William A Rivera
*Assistant Examiner* — Michael Riegelman
(74) *Attorney, Agent, or Firm* — Kramer Levin Naftalis & Frankel LLP (57) ABSTRACT

Retention mechanisms for bicycle drive trains are disclosed. In some embodiments, a retention mechanism may include a backplate having at least one spur, at least one chain ring coupled to the backplate, and a slider coupled to the spur. The slider may be positioned between the at least one chain ring and a bicycle chain, and may include at least one track and at least one chain guide (e.g., an O-ring or ring component) seated in the track. The at least one chain guide may be configured to rotate about the track while applying tension to the bicycle chain so as to reduce friction and/or dampen noise.

20 Claims, 11 Drawing Sheets

RETENTION MECHANISMS FOR BICYCLE DRIVE TRAINS

CROSS-REFERENCE TO RELATED APPLICATIONS

This application claims the benefit of U.S. Provisional Patent Application No. 61/601,013, filed Feb. 20, 2012, the disclosure of which is incorporated by reference herein in its entirety.

BACKGROUND

Typical bicycle drive trains include a crank arm assembly affixed to one or more front chain rings. A chain engages a front chain ring for transferring power to a rear cassette of one or more rear chain rings affixed to the rear wheel axle. Chains in these typical systems are retained by providing tension between the front and rear chain rings. With extended and/or rough usage, however, chains can become loose and lose tension, increasing the risk that the chain will disengage from one or more of the chain rings.

SUMMARY

Retention mechanisms for bicycle drive trains are disclosed. Such retention mechanisms can include a slider coupled to a backplate of a bicycle drive train assembly. The slider can be positioned beneath one or more of the front chain rings in order to provide additional tension to the chain and prevent accidental slippage and/or disengagement of the chain from one or more of the chain rings. In some embodiments, the slider can include an O-ring that may reduce friction and/or dampen noise.

In some embodiments, a retention mechanism for a bicycle drive train may be provided. The retention mechanism may include a backplate having at least one spur, at least one chain ring coupled to the backplate, and a slider coupled to the at least one spur. The slider may include at least one track and at least one chain guide seated in the at least one track. The slider may be configured to apply tension to a bicycle chain insertable between the at least one track and the at least one chain ring.

In some embodiments, a slider for a bicycle chain may be provided. The slider may include an inner slider component, an outer slider component adjacent the inner slider component, at least one track disposed between the inner and outer slider components, and at least one chain guiding component disposed on the at least one track. The at least one chain guiding component may be operative to apply tension to the bicycle chain during rotation of a bicycle chain ring.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION

Figure 1A:
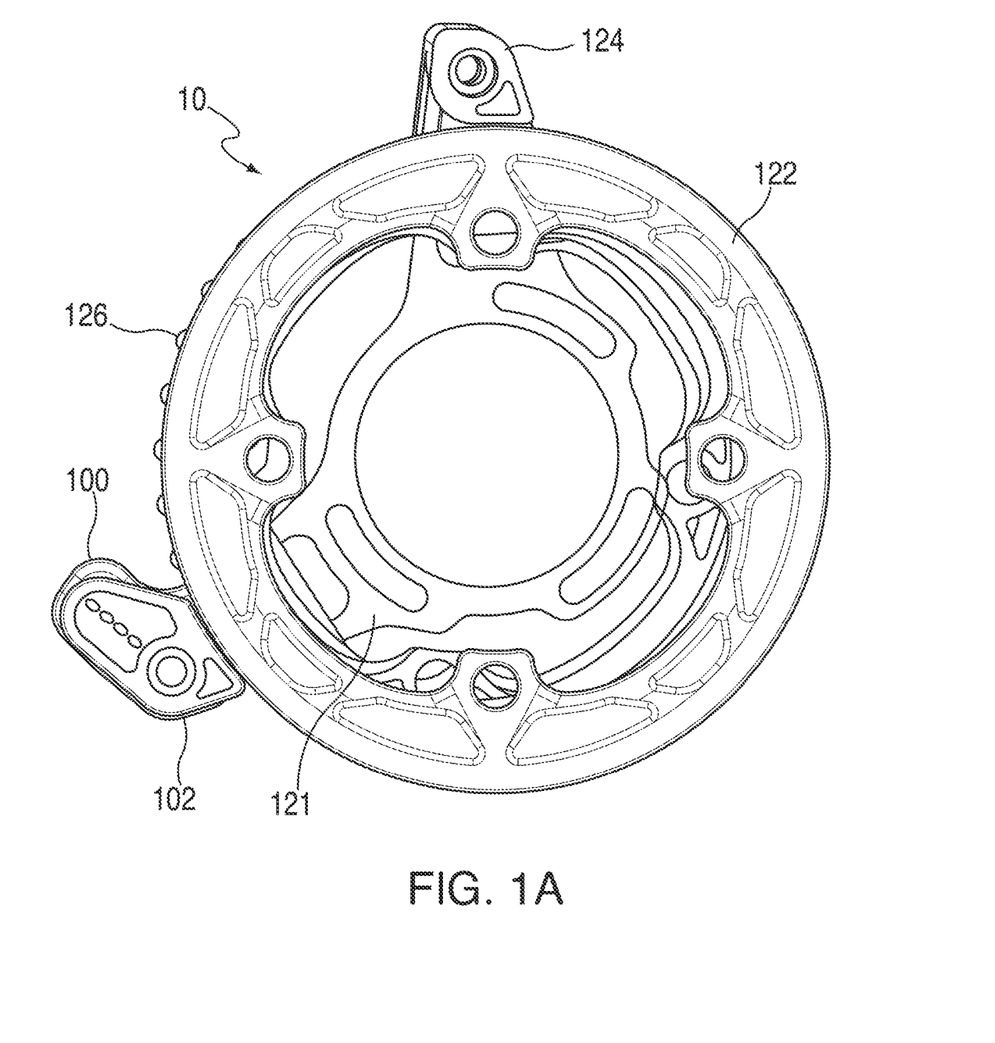
FIG. 1A is a side view of a single chain ring device assembly including a lower slider, in accordance with at least one embodiment.
Figure 1B:
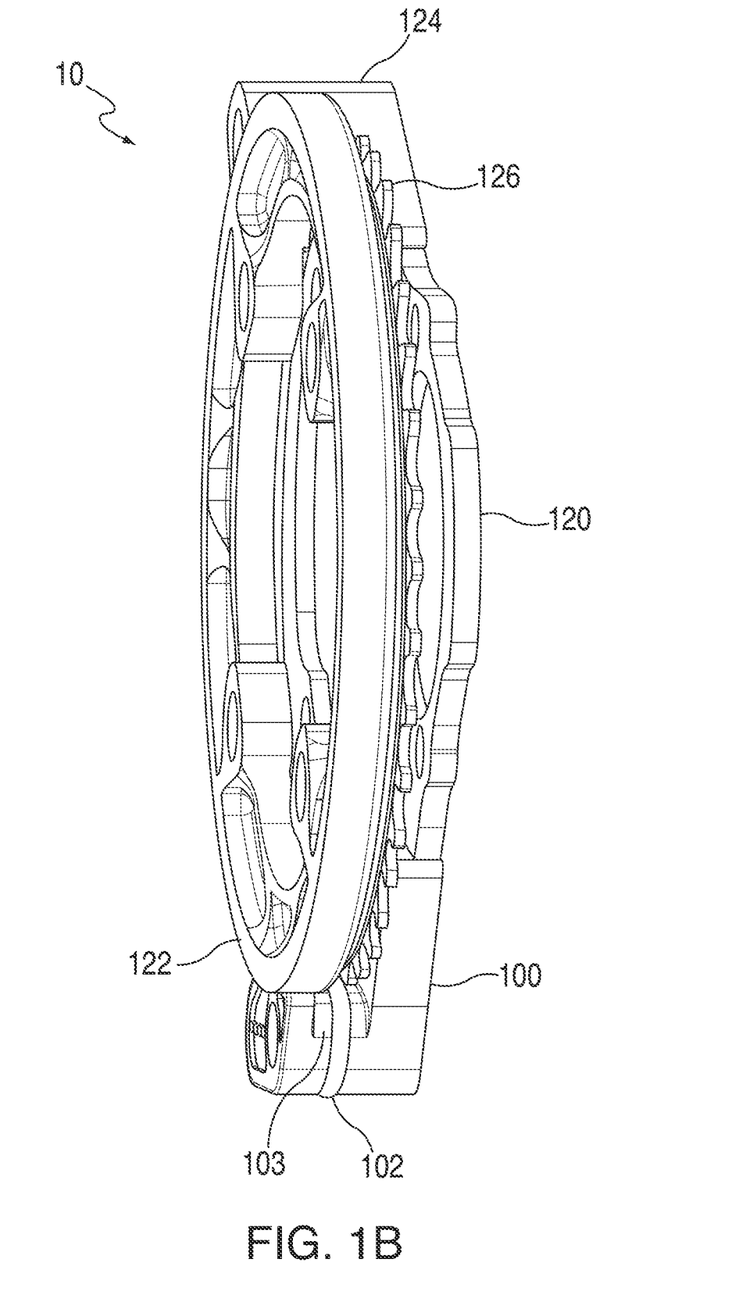
FIGS. 1B and 1C are perspective views of the single chain ring device assembly of FIG. 1A, in accordance with at least one embodiment.
Figure 1C:
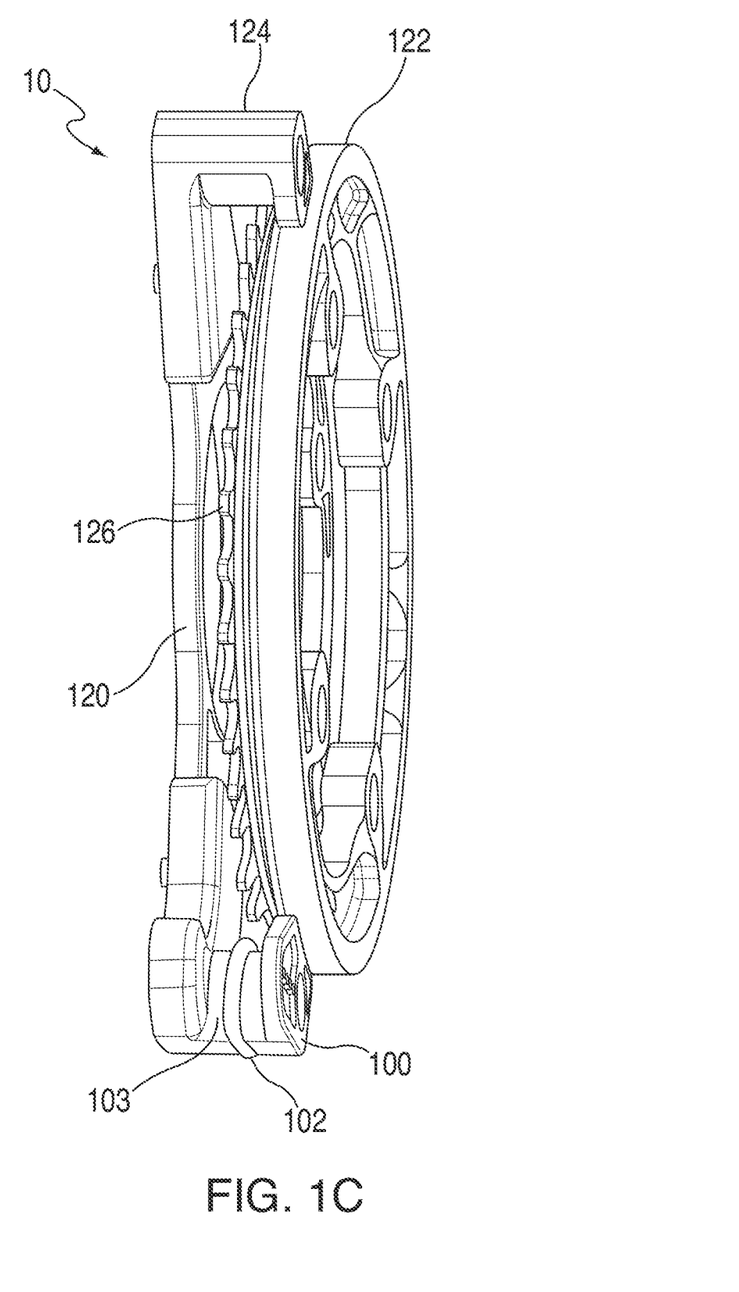

FIG. 1A is a side view of a single chain ring device assembly 10, and FIGS. 1B and 1C are perspective views of single chain ring device assembly 10. As shown in FIGS. 1A-1C, assembly 10 may include a lower slider 100 that may include an O-ring 102 that may serve as a chain guide or guiding component. Assembly 10 may also include a backplate 120 having a top guide 124. Additionally, assembly 10 may include a bashguard 122 and a chain ring 126. A chain (not shown) can be attached to chain ring 126 in order to transfer power from chain ring 126 to a gear cassette affixed to a rear wheel (also not shown). Backplate 120, bashguard 122, and chain ring 126 can be configured in a stack, with backplate 120 fixedly coupled to a bicycle frame, and with chain ring 126 free to rotate around a pedal axle. Bashguard 122 may, in various embodiments, be fixedly coupled to the bicycle frame or to chain ring 126 to help protect the chain and chain ring 126. Because assembly 10 may include one chain ring, it may, for example, be part of a 1×9 or 1×10 bicycle drive train.

Lower slider 100 can interface with, interact with, or otherwise be coupled to a branch, arm, or spur 121 of backplate 120 (e.g., with one or more bolts or any other suitable fastening mechanism). Spur 121 may allow lower slider 100 to be positioned close to the bottom of backplate 120 and outside of the radius of chain ring 126 such that the chain can be threaded between lower slider 100 and chain ring 126. As a cyclist pedals the bicycle, chain ring 126 can rotate the chain around assembly 10 between chain ring 126 and lower slider 100. This arrangement may result in increased tension on the chain and, therefore, a reduced risk of the chain disengaging or slipping from chain ring 126. Lower slider 100 may be formed from any suitable material (e.g., plastic, aluminum, or steel), and may be formed in, for example, an injection molding process. According to some embodiments, a lower slider may also be coupled to a gear cassette affixed to a rear wheel in order to prevent the chain from slipping off of the chain rings in the rear gear cassette.

As described above, lower slider 100 may include O-ring 102. O-ring 102 may be seated in a track 103 of lower slider 100, and may contact a portion of the chain near the bottom of chain ring 126 (e.g., near the bottom of backplate 120). As the bicycle is pedaled and the chain is turned around chain ring 126, O-ring 102, being in contact with the moving chain, can rotate around track 103 as needed, which may reduce friction and/or dampen noise. That is, although O-ring 102 may be seated in track 103 and may not laterally shift with respect to track 103, O-ring 102 may still be free to rotate about track 103 as the chain moves. O-ring 102 may be formed from any suitable durable and pliable material (e.g., a natural or synthetic rubber or thermoplastic), and may be substantially circular prior to being coupled or seated in track 103. However, as shown in FIGS. 1A-1C, the shape of O-ring 102 may be adjusted to accommodate the shape of lower slider 100 when O-ring 102 is seated in track 103.

Top guide 124 can control the engagement between the chain and chain ring 126 as the chain is rotated around assembly 10. In some embodiments, top guide 124 may be formed integrally with backplate 120. In other embodiments, however, top guide 124 may be coupled to a second spur 123 of backplate 120. Top guide 124 may be configured to extend above and outside of chain ring 126 to help engage the chain with the top of chain ring 126 and to prevent the chain from slipping laterally off of assembly 10.

Figure 2A:
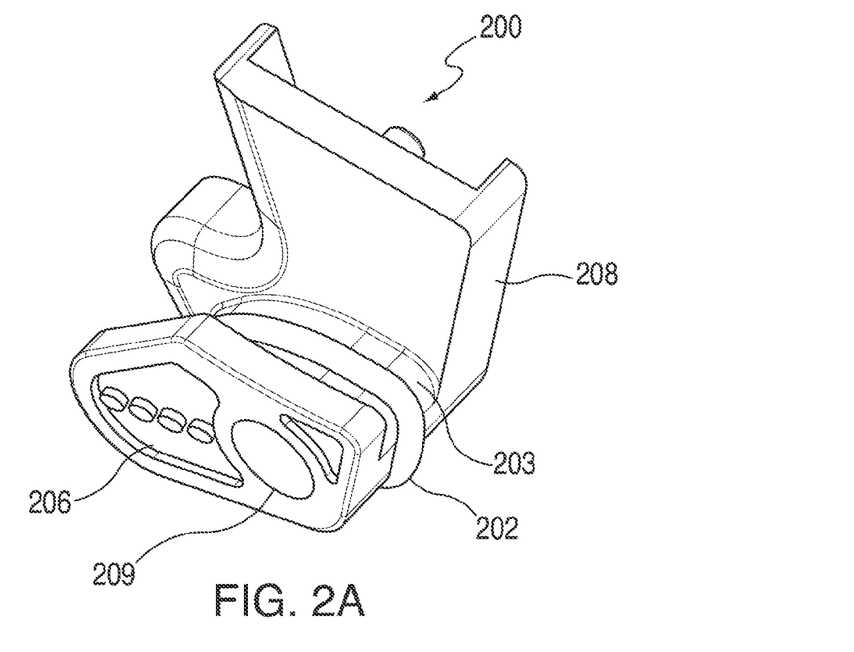
FIGS. 2A and 2B are perspective views of a lower slider, in accordance with at least one embodiment.
Figure 2B:
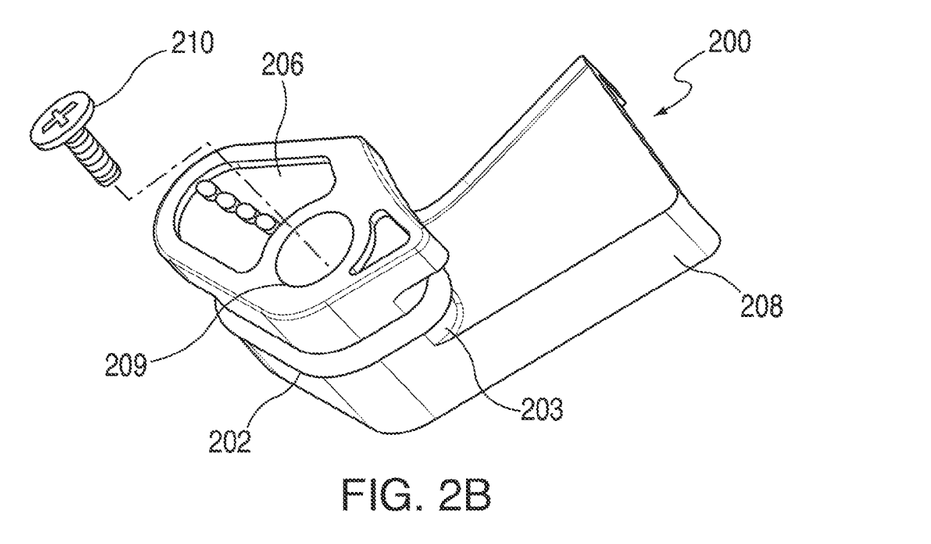

FIGS. 2A and 2B are perspective views of a lower slider 200, which may be similar to lower slider 100 of FIGS. 1A-1C. For example, as shown in FIG. 2A, lower slider 200 may include an O-ring 202 and a track 203 that may be similar to O-ring 102 and track 103, respectively, of lower slider 100. Lower slider 200 may also include an inner slider component 206, an outer slider component 208, and a fastener passage 209. O-ring 202 may be seated in track 203, which can be configured to contact and provide tension to a bicycle chain. O-ring 202 and track 203 and can be positioned to provide tension to the chain as the chain exits a chain ring (e.g., where the chain is most likely to be slack).

Inner slider component 206 may have a ridge extending perpendicularly from track 203 to help define track 203 and prevent O-ring 202 from sliding off of lower slider 200 laterally. The ridge of inner slider component 206 does not need to be high enough to prevent lateral movement of the chain because the chain may be laterally restrained by a bashguard (e.g., bashguard 122 of FIGS. 1A-1C). Outer slider component 208 may form a wall extending perpendicularly from track 203 and opposing inner slider component 206. The height of outer slider component 208 may be chosen to prevent lateral slippage of the chain.

Fastener passage 209 may extend fully or part of the way through lower slider 200 (e.g., through inner and outer slider components 206 and 208) and may be configured to accept a fastener (e.g., a screw or a bolt) suitable for interfacing or otherwise coupling lower slider 200 (e.g., outer slider component 208) to a spur of a backplate (e.g., spur 121 of backplate 120 of FIG. 1). For example, outer slider component 208 may include a surface for interfacing or coupling to a spur of a backplate. In some embodiments, each of fastener passage 209 and a corresponding portion of the spur (e.g., a hole in the spur) may include threaded inserts for securing the fastener. For example, fastener 210 may be inserted into fastener passage 209 to couple lower slider 200 to a backplate (e.g., backplate 120 of FIG. 1).

Figure 3A:
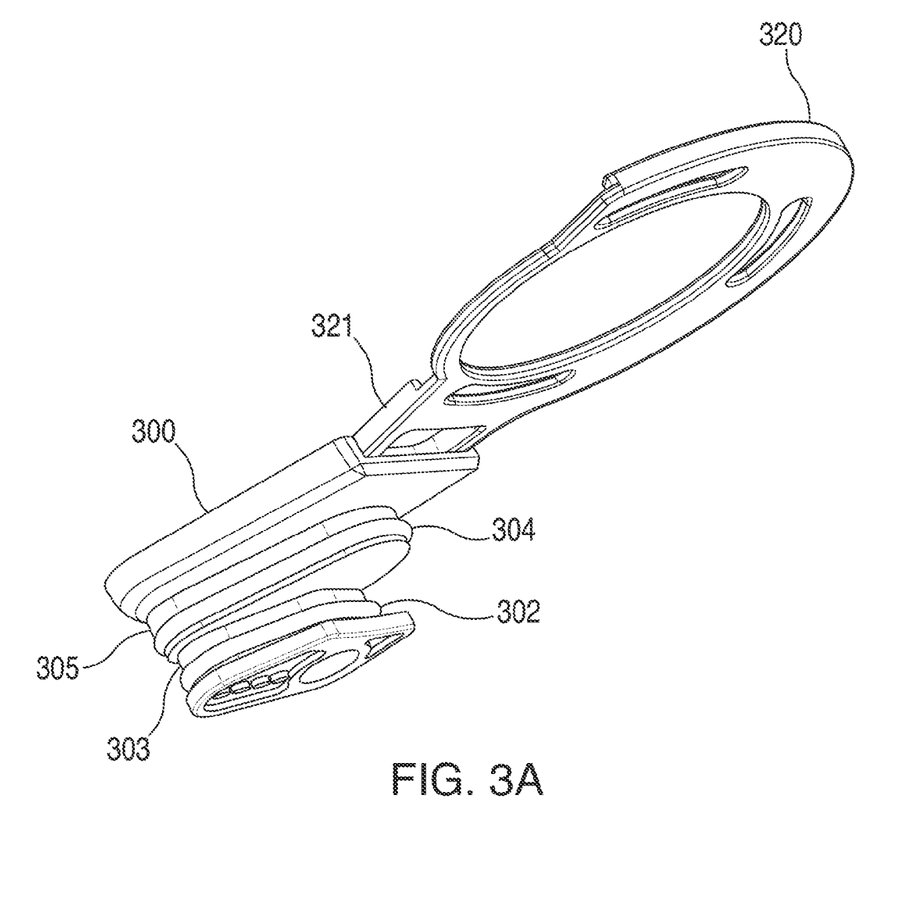
FIG. 3A is a perspective view of a backplate and a lower slider of a dual chain ring device assembly.
Figure 3B:
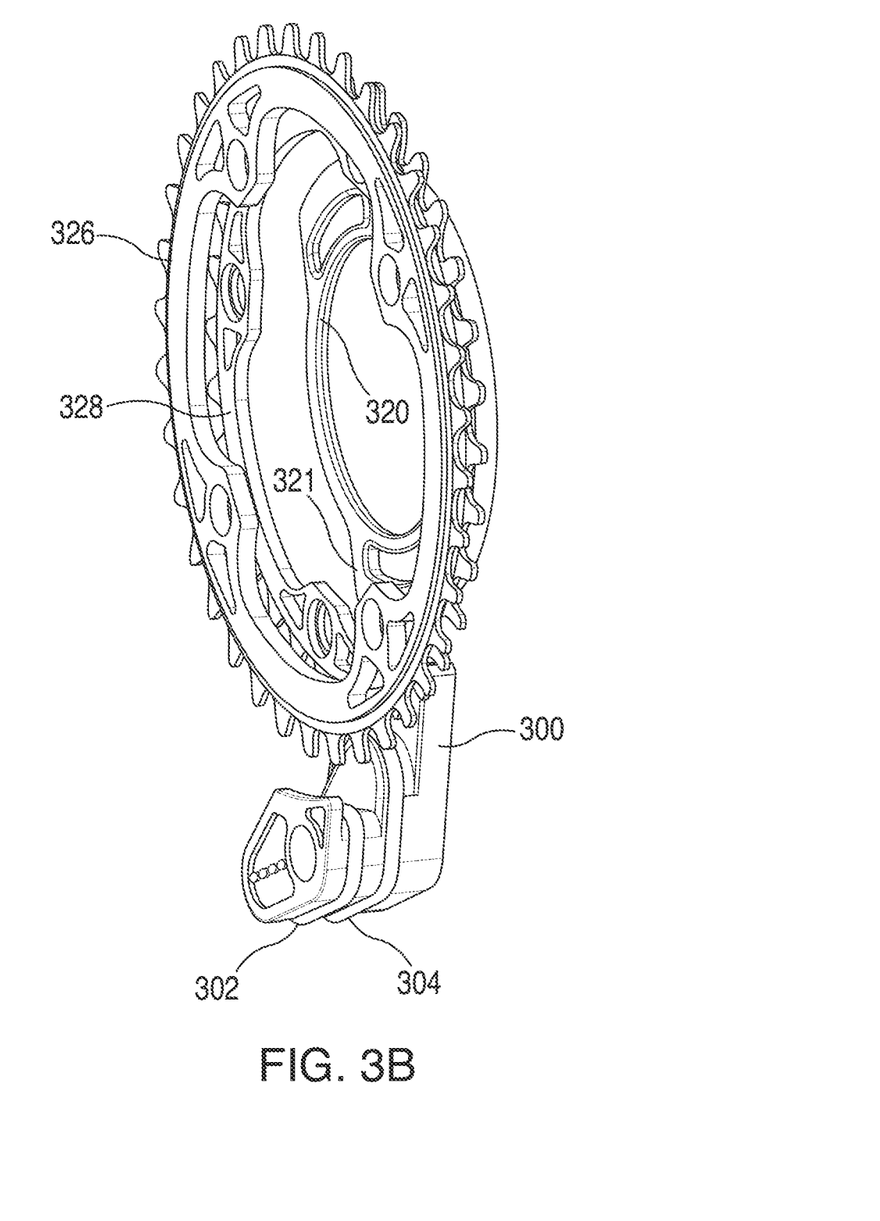
FIG. 3B is a perspective view of the same structures of FIG. 3A after two chain rings have been added.
Figure 3C:
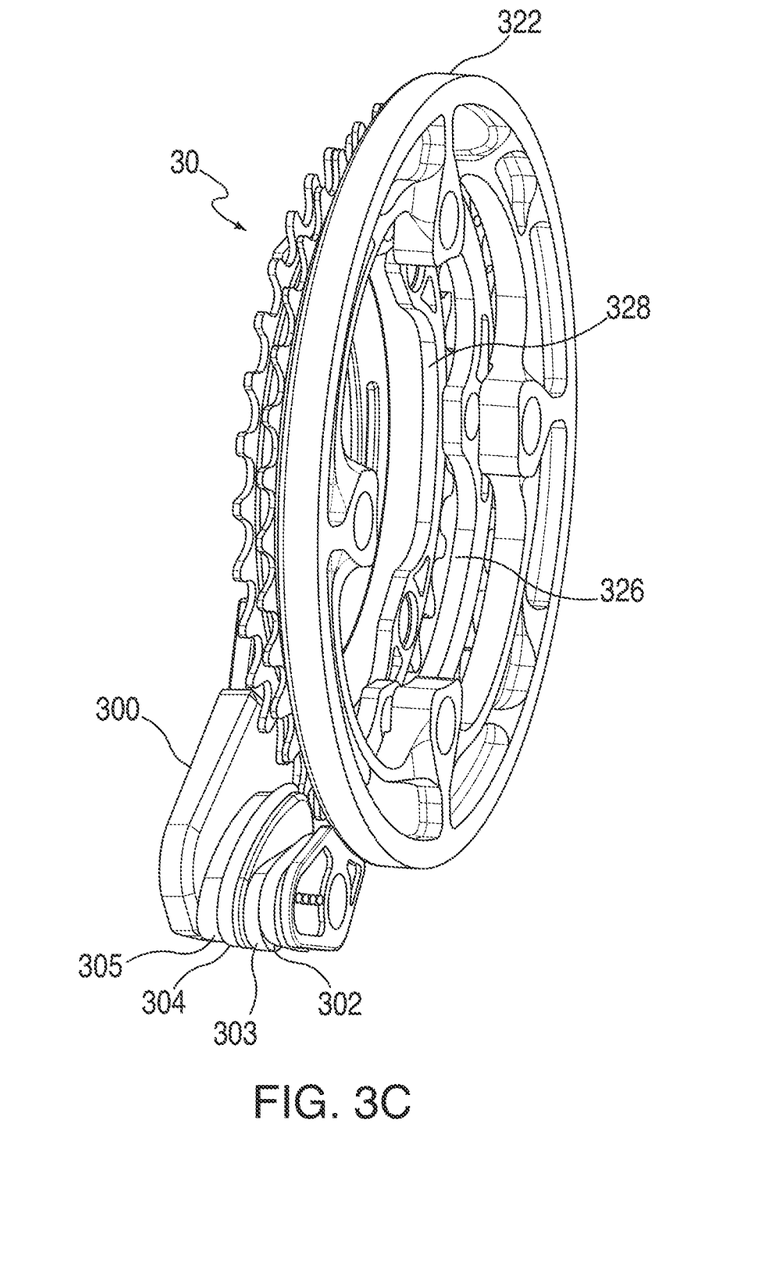
FIG. 3C is a perspective view of the same structures of FIG. 3B after a bashguard has been added.

FIG. 3A is a perspective view of a backplate 320 and a lower slider 300 of a dual chain ring device assembly 30. FIG. 3B is a perspective view of the same structures of FIG. 3A after two chain rings 326 and 328 have been added. FIG. 3C is a perspective view of the same structures of FIG. 3B after a bashguard 322 has been added. Assembly 30 may be similar to assembly 10, and may, in addition to lower slider 300 and backplate 320, include a bashguard 322, a first chain ring 326, and a second chain ring 328. A chain (not shown) can be attached to first chain ring 326 or second chain ring 328 in order to transfer power from that chain ring to a gear cassette affixed to a rear wheel (not shown). The chain can be switched between first chain ring 326 and second chain ring 328 with a derailleur (not shown).

Bashguard 322, first chain ring 326, and second chain ring 328 can be configured in a stack, with backplate 320 fixedly coupled to a bicycle frame, and with chain rings 326 and 328 free to rotate around a pedal axle. Bashguard 322 may, in various embodiments, additionally or alternatively be fixedly coupled to the bicycle frame or one or more of chain rings 326 and 328 to help protect the chain and the chain rings. Because assembly 30 may include two chain rings, it may, for example, be part of a 2×9 or 2×10 bicycle drive train.

Similar to lower slider 100, lower slider 300 may, as shown in FIGS. 3A-3C, be coupled to a spur 321 of backplate 320 (e.g., with one or more bolts or any other suitable fastening mechanism). However, rather than including only one O-ring (e.g., as with lower sliders 100 and 200), lower slider 300 of assembly 30 may include two O-rings 302 and 304, each corresponding to one of chain rings 326 and 328.

Spur 321 may allow lower slider 300 to be positioned close to the bottom of backplate 320 and outside of the radius of chain rings 326 and 328 such that the chain can be threaded between lower slider 300 and the chain rings. As a cyclist pedals the bicycle, chain ring 326 or 328 can rotate the chain around assembly 30 between the engaged chain ring and a corresponding track of lower slider 300. This arrangement may result in increased tension on the chain and, therefore, a reduced risk of the chain disengaging or slipping from chain ring 326 or 328. Lower slider 300 may be formed from any suitable material (e.g., plastic, aluminum, or steel).

As shown in FIG. 3C, for example, track 305 of lower slider 300 may be elevated closer to the center of assembly 30 than track 303 is, in order to engage the smaller radius second chain ring 328. Likewise, track 303 may be configured to accommodate the chain when the chain is engaged on the larger radius first chain ring 326.

O-rings 302 and 304 may be seated in tracks 303 and 305, respectively, which may contact a portion of the chain near the bottom of backplate 320. As the bicycle is pedaled and the chain is turned around chain ring 326 or 328, the corresponding O-ring 302 or 304, being in contact with the moving chain, can rotate around the track of lower slider 300 as needed to reduce friction and/or dampen noise. O-rings 302 and 304 may be any ring component formed from any suitable strong and pliable material (e.g., a natural or synthetic rubber or thermoplastic).

It should be appreciated that assembly 30 may not include a top guide as discussed above with respect to top guide 124 of assembly 10 of FIG. 1. This is because a front derailleur can be included for controlling the chain engagement and for shifting the chain between first chain ring 326 and second chain ring 328.

Figure 4A:
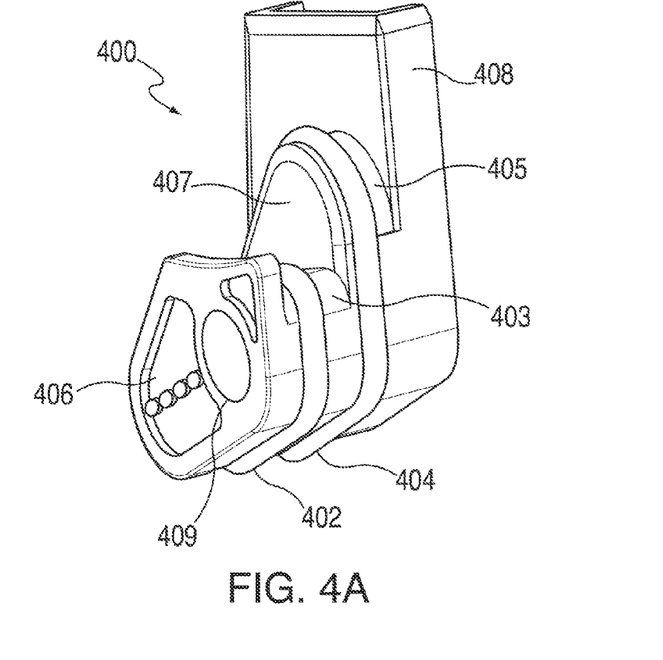
FIGS. 4A and 4B are perspective views of a lower slider, in accordance with at least one embodiment.
Figure 4B:
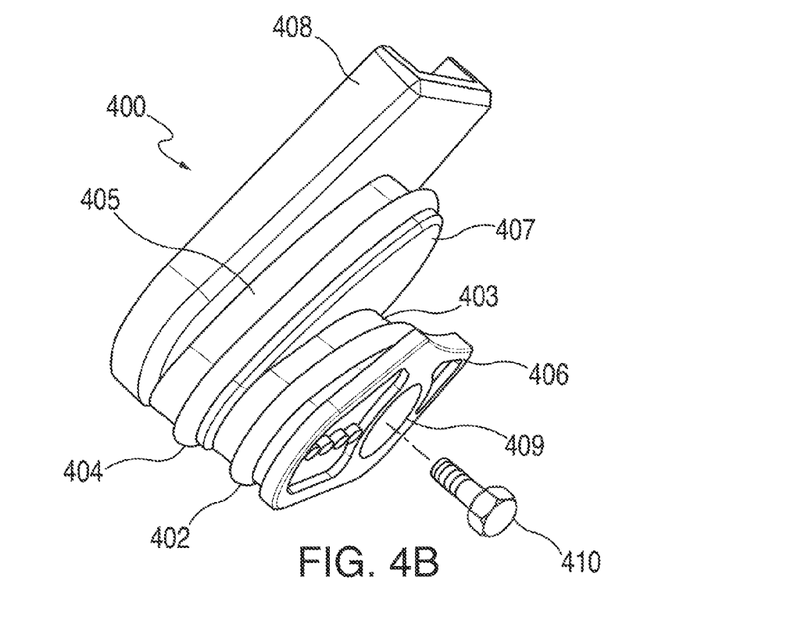

FIGS. 4A and 4B are perspective views of a lower slider 400. Lower slider 400 may be similar to lower slider 300 of FIGS. 3A-3C. More particularly, lower slider 400 may include components that may be similar to those of lower slider 300 described above with respect to FIGS. 3A-3C. For the sake of clarity, the last two digits of each component of lower slider 400 is intended to match the last two digits of each component of lower slider 300 (in which case, the description is substantially similar as well). Lower slider 400 may also be similar to lower slider 100, but as with slider 300, may include two tracks rather than one. As shown in FIGS. 4A and 4B, lower slider 400 may include O-rings 402 and 404, tracks 403 and 405, an inner slider component 406, a middle slider component 407, an outer slider component 408, and a fastener passage 409. Lower slider 400 may be used to retain a chain for a bicycle with dual front chain rings (e.g., for a 2×9 or 2×10 bicycle drive train).

O-rings 402 and 404 may be seated in tracks 403 and 405, respectively, which can be configured to contact and provide tension to a bicycle chain. The chain can be in contact with one track or the other based on which chain ring is being used. Tracks 403 and 405 and O-rings 402 and 404 can be positioned to provide tension to the chain as the chain exits the chain rings (e.g., where the chain is most likely to be slack).

Inner slider component 406 may have a ridge extending perpendicularly from track 403 to help define track 403 and prevent O-ring 402 from sliding off of lower slider 400 laterally. The ridge of inner slider component 406 does not need to be high enough to prevent lateral movement of the chain because the chain may be laterally restrained by a bashguard (e.g., bashguard 322 of FIG. 3). Middle slider component 407 can form a wall extending perpendicularly from track 403 and opposing inner slider component 406. The height of middle slider component 407 may be chosen to prevent lateral slippage of the chain. Similarly, outer slider component 408 may extend perpendicularly from track 405 to prevent lateral slippage of the chain when that track is engaged with the chain.

Fastener passage 409 may extend fully or part of the way through lower slider 400 and may be configured to accept a fastener (e.g., a screw or a bolt) suitable for coupling lower slider 400 to a spur of a backplate (e.g., spur 321 of backplate 320 of FIGS. 3A-3C). In some embodiments, fastener passage 409 may include threaded inserts for securing the fastener. As shown in FIG. 4B, for example, a fastener 410 may be inserted into fastener passage 409 to couple lower slider 400 to a backplate (e.g., backplate 320 of FIGS. 3A-3C).

Figure 5A:
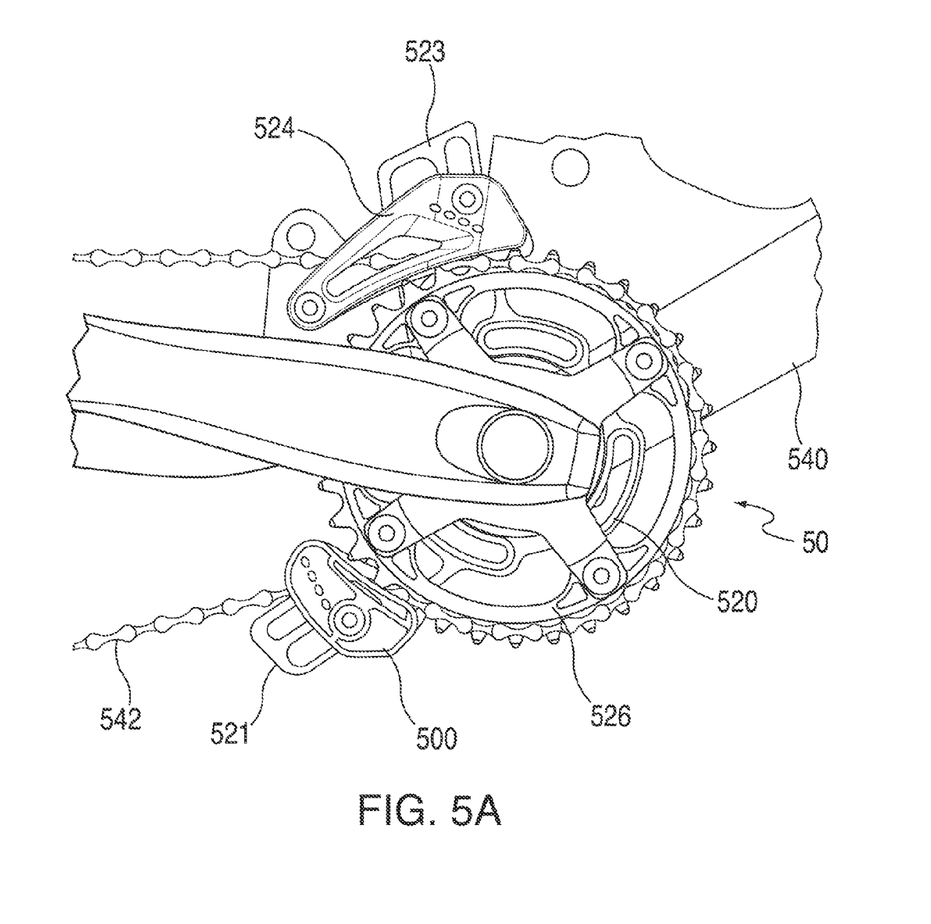
FIG. 5A is a side view of a bicycle frame coupled to a chain retention assembly, in accordance with at least one embodiment.
Figure 5B:
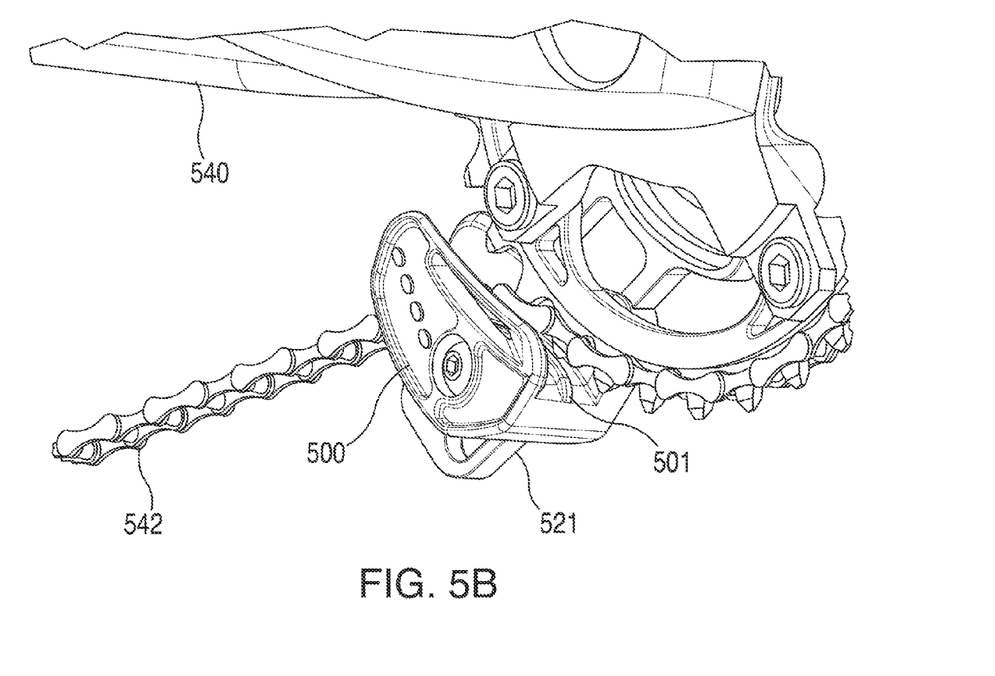
FIG. 5B is a partial perspective view of the bicycle frame and chain retention assembly of FIG. 5A, in accordance with at least one embodiment.

In some embodiments, a lower slider may include a ridge over which pins or links of a chain may slide or traverse. FIG. 5A is a side view of a bicycle frame 540 coupled to a chain retention assembly 50. FIG. 5B is a partial perspective view of bicycle frame 540 and chain retention assembly 50. Chain retention assembly 50 may be similar to each of assemblies 10 and 30. However, rather than including a lower slider having one or more O-rings, assembly 50 may include a lower slider 500 having a ridge 501 (described in more detail below). Assembly 50 may also include a backplate 520 and a chain ring 526. Chain 542 may be attached to chain ring 526 in order to transfer power from chain ring 526 to a gear cassette affixed to a rear wheel (not shown).

Backplate 520 and chain ring 526 can be configured in a stack, with backplate 520 fixedly coupled to bicycle frame 540, and with chain ring 526 free to rotate around a pedal axle (not shown). Although not shown, in some embodiments, assembly 50 may also include a bashguard (e.g., similar to bashguards 122 and 322).

Similar to lower sliders 100 and 300, lower slider 500 may, as shown in FIGS. 5A and 5B, be coupled to a spur 521 of backplate 520 (e.g., with one or more bolts or any other suitable fastening mechanism). However, as described above, lower slider 500 may include a ridge as the chain guide or guiding component, rather than one or more O-rings, for at least partially interfacing with chain 542.

In some embodiments, ridge 501 may be integrated into lower slider 500 and may provide smooth and consistent contact, reducing noise and drag when chain 542 slides or traverses over ridge 501. In other embodiments, ridge 501 may be a separate component integrated with lower slider 500. Regardless of the configuration of ridge 501, as a cyclist pedals the bicycle, assembly 50 may provide an increased tension on chain 542 and, therefore, a reduced risk of chain 542 disengaging or slipping from chain ring 526.

More particularly, as the bicycle is pedaled and chain 542 is turned around chain ring 526, ridge 501, being in contact with the moving chain 542, may rotate around lower slider 500 as needed to reduce friction and/or dampen noise. Lower slider 500 and ridge 501 may each be formed from any suitable material (e.g., plastic, aluminum, or steel).

Similar to assembly 10, assembly 50 may include a top guide 524 for controlling the engagement between chain 542 and chain ring 526 as chain 542 is rotated around assembly 50. In some embodiments, top guide 524 may be formed integrally with backplate 520. In other embodiments, however, top guide 524 may be coupled to a second spur 523 of backplate 520. Top guide 524 may be configured to extend above and outside of chain ring 526 to help engage chain 542 with the top of chain ring 526 and to prevent chain 542 from slipping laterally off of assembly 50.

It should be appreciated that, although FIGS. 5A and 5B may only show lower slider 500 having a single track and ridge, in some embodiments, a lower slider may include two or more tracks and respective ridges configured to guide a bicycle chain drivable by one of multiple chain rings.

Figure 6:
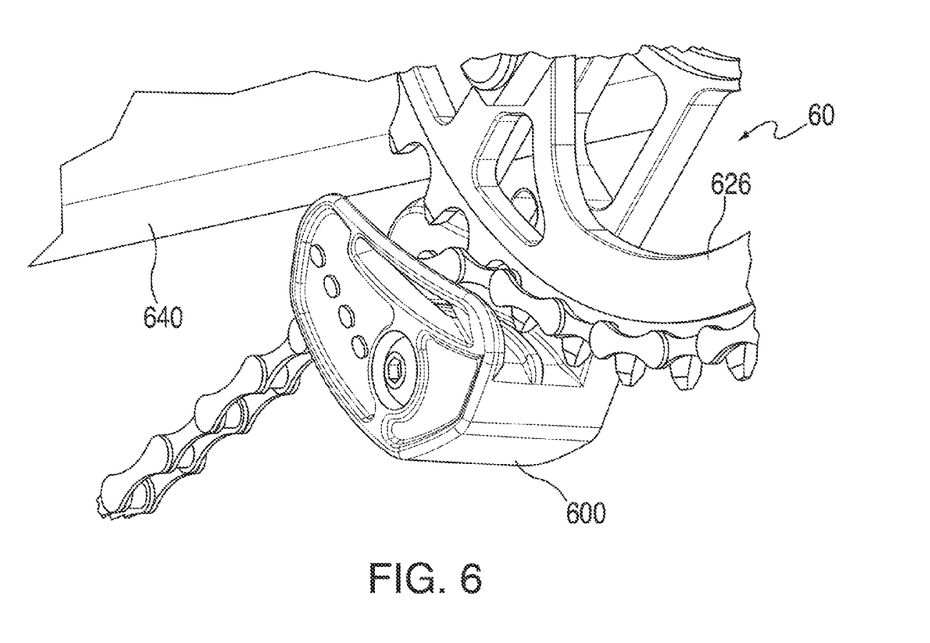
FIG. 6 is a partial perspective view of a bicycle frame and a chain retention assembly having an alternate chain ring, in accordance with at least one embodiment.

FIG. 6 is a perspective view of a bicycle frame 640 and a chain retention assembly 60 having an alternate chain ring 626. Assembly 60 may be similar to assembly 50, but may differ only in chain ring 626 having a slightly different configuration than chain ring 526. For example, assembly 60 may include a lower slider 600 that may be similar to lower slider 500.

While there have been described retention mechanisms for bicycle drive trains, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms such as "up and down," "front" and "back," "top" and "bottom," "left" and "right," "length" and "width," "upper" and "lower," "above" and "beneath," and the like are used herein only for convenience, and that no fixed or absolute directional or orientational limitations are intended by the use of these words. For example, the devices of this invention can have any desired orientation. If reoriented, different directional or orientational terms may need to be used in their description, but that will not alter their fundamental nature as within the scope and spirit of this invention.

Therefore, those skilled in the art will appreciate that the invention can be practiced by other than the described embodiments, which are presented for purposes of illustration rather than of limitation.

What is claimed is:

1. A retention mechanism for a bicycle drive train, the retention mechanism comprising:
    a backplate having at least one spur;
    at least one chain ring coupled to the backplate; and
    a slider coupled to the at least one spur, the slider comprising:
        at least one track; and
        at least one O-ring seated in the at least one track, the at least one O-ring being configured to apply tension to a bicycle chain insertable between the at least one track and the at least one chain ring.

2. The retention mechanism of claim 1, wherein the at least one O-ring is configured to rotate about the at least one track when applying tension to the bicycle chain.

3. The retention mechanism of claim 1, wherein the at least one track comprises a single track.

4. The retention mechanism of claim 3, wherein the at least one O-ring comprises a single O-ring.

5. The retention mechanism of claim 4, wherein the at least one chain ring comprises a single chain ring, and wherein the single chain ring is operative to drive the bicycle chain onto the single track and the single O-ring.

6. The retention mechanism of claim 1, wherein the at least one chain ring comprises first and second chain rings, wherein the at least one track comprises first and second tracks, and wherein the at least one O-ring comprises first and second O-rings.

7. The retention mechanism of claim 6, wherein the first O-ring is seated in the first track.

8. The retention mechanism of claim 7, wherein the second O-ring is seated in the second track.

9. The retention mechanism of claim 8, wherein the first track and the first O-ring are shifted in position from the second track and the second O-ring in a particular direction.

10. The retention mechanism of claim 7, wherein the first chain ring is operative to drive the bicycle chain onto the first track and the first O-ring.

11. The retention mechanism of claim 10, wherein the second chain ring is operative to drive the bicycle chain onto the second track and the second O-ring.

12. A slider for a bicycle chain, the slider comprising:
an inner slider component;
an outer slider component adjacent the inner slider component;
at least one track disposed between the inner and outer slider components; and
at least one ring component disposed around the at least one track, the at least one ring component operative to apply tension to the bicycle chain during rotation of a bicycle chain ring and wherein the at least one ring component comprises an O-ring.

13. The slider of claim 12, wherein the at least one ring component is configured to rotate about the at least one track when applying tension to the bicycle chain.

14. The slider of claim 12 further comprising a fastener passage.

15. The slider of claim 14 further comprising a fastener disposed through the fastener passage, the fastener operative to couple to a portion of a spur of a backplate.

16. The slider of claim 12, wherein the at least one track comprises a single track, and wherein the at least one ring component comprises a single ring component.

17. The slider of claim 12, wherein the at least one track comprises first and second tracks, and wherein the at least one ring component comprises first and second ring components.

18. The slider of claim 17, wherein the first ring component is seated in the first track.

19. The slider of claim 18, wherein the second ring component is seated in the second track.

20. The slider of claim 19, wherein the first track and the first ring component are positioned adjacent to the second track and the second ring component.

* * * * *